(12) United States Patent
Knight et al.

(10) Patent No.: US 11,077,934 B2
(45) Date of Patent: Aug. 3, 2021

(54) AIRCRAFT, CONTROL SURFACE ARRANGEMENTS, AND METHODS OF ASSEMBLING AN AIRCRAFT

(71) Applicant: Gulfstream Aerospace Corporation, Savannah, GA (US)

(72) Inventors: Michael Knight, Savannah, GA (US); James Grieco, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 276 days.

(21) Appl. No.: 16/291,527

(22) Filed: Mar. 4, 2019

(65) Prior Publication Data

US 2019/0193838 A1 Jun. 27, 2019

Related U.S. Application Data

(63) Continuation of application No. 14/567,771, filed on Dec. 11, 2014, now Pat. No. 10,220,938.

(51) Int. Cl.
*B64C 13/38* (2006.01)
*B64C 9/02* (2006.01)
*B64C 13/24* (2006.01)

(52) U.S. Cl.
CPC ............... *B64C 13/38* (2013.01); *B64C 9/02* (2013.01); *B64C 13/24* (2013.01); *Y02T 50/40* (2013.01)

(58) Field of Classification Search
CPC .. B64C 13/28; B64C 9/02; B64C 3/48; B64C 3/50

See application file for complete search history.

(56) References Cited

U.S. PATENT DOCUMENTS

| | | | |
|---|---|---|---|
| 5,722,616 A | 3/1998 | Durand | |
| 5,864,922 A * | 2/1999 | Kraft | B64D 29/06 16/239 |
| 7,600,297 B2 * | 10/2009 | Gitnes | B64C 3/56 16/331 |
| 9,163,648 B2 * | 10/2015 | Kim | F15B 15/02 |
| 9,816,537 B2 * | 11/2017 | Kim | F15B 15/125 |
| 2006/0065778 A1 * | 3/2006 | Kannapell | B64C 13/30 244/99.2 |
| 2014/0001309 A1 * | 1/2014 | Tieys | B64C 3/50 244/99.3 |
| 2014/0238227 A1 * | 8/2014 | Kim | F15B 15/02 92/2 |
| 2016/0229524 A1 * | 8/2016 | Huynh | B64C 9/00 |

FOREIGN PATENT DOCUMENTS

CN 103507946 A 1/2014

* cited by examiner

*Primary Examiner* — Valentina Xavier
(74) *Attorney, Agent, or Firm* — LKGlobal | Lorenz & Kopf, LLP

(57) ABSTRACT

An aircraft, a control surface arrangement, and a method of assembling an aircraft are disclosed herein. In an exemplary embodiment, the aircraft includes, but is not limited to, an airframe, a control surface, and a rotary actuator. The rotary actuator rotatably mounts the control surface to the airframe. The rotary actuator supports the control surface on the airframe and is configured to rotate the control surface with respect to the airframe when the rotary actuator is actuated. The rotary actuator is further configured to deliver torque to the control surface from a longitudinally intermediate portion of the rotary actuator.

16 Claims, 9 Drawing Sheets

AIRCRAFT, CONTROL SURFACE ARRANGEMENTS, AND METHODS OF ASSEMBLING AN AIRCRAFT

CROSS-REFERENCE TO RELATED APPLICATION

This application is a continuation of U.S. patent application Ser. No. 14/567,771, filed Dec. 11, 2014, and entitled Aircraft, Control Surface Arrangements, And Methods of Assembling an Aircraft which is hereby incorporated herein by reference.

TECHNICAL FIELD

The present invention generally relates to aircraft and more particularly relates to the use of a rotary actuator to serve as both an actuator that moves a control surface and as a hinge that pivotally supports the control surface on an airframe.

BACKGROUND

A modern passenger aircraft commonly includes an airframe having one or more control surfaces that control the orientation of the airframe as it moves through the atmosphere. Examples of control surfaces include ailerons, elevators, and rudders, to name just a few. The control surfaces are rotatably mounted to the airframe and rotate in response to control inputs from the aircrew during flight operations.

Conventionally, control surfaces are mounted to the airframe via one or more hinges that both support the control surface on the airframe and that permit the control surface to pivot with respect to the airframe. In a conventional arrangement, a linear actuator is used to control rotation of the control surface. The linear actuator is mounted to the airframe at one end and to a bell crank arm at the opposite end. The bell crank arm is mounted to the control surface. The linear actuator actuates in response to an input (e.g., a pilot pulling back or pushing forward on the yoke). Upon actuation, a piston in the linear actuator extends or retracts (depending on the input) in a linear manner. This moves the bell crank arm which, in turn, causes the control surface to pivot about the hinge that connects it to the airframe.

While this arrangement is satisfactory for current designs, there are limits to its application. As aircraft are designed to fly increasingly higher and faster (e.g., supersonic), the use of thinner airframes and thinner control surfaces become necessary. The use of thinner airframes and thinner control surfaces reduces the amount of space available to house the conventional arrangement described above. As the volume available for housing this arrangement diminishes, the length of the bell crank arm must be correspondingly reduced. As the length of the bell crank arm is reduced, the amount of torque required to move the control surface will increase. This need for increased torque requires the use of a more powerful linear actuator. The use of a more powerful linear actuator requires more robust support structures and more robust hinges. The more robust that the support structure and the hinges are, the more volume they will consume. This increased consumption of volume leaves even less room for the bell crank arm which must now shrink even further, causing a new cycle to begin and yielding a spiral of self-defeating solutions.

Some solutions to this challenge have been employed, but none are particularly desirable. In one solution, bulges and protrusions have been designed into the airframe to provide added volume to accommodate the larger components. This solution is undesirable because it gives rise to unsightly deviations from an otherwise smooth outer mold line. Additionally, in the case of supersonic aircraft, bulges and protrusions from the surface of the airframe can increase the strength of the sonic boom generated by the aircraft during supersonic flight. In another solution, rather than increasing the robustness of the various components of the above-described arrangement, additional linear actuators are employed instead. This is not desirable because it increases the cost, the weight, the part count, the number of failure points, and the overall complexity of the arrangement. Thus, while these solutions may be effective, there is room for improvement.

Accordingly, it is desirable to provide an aircraft and a control system arrangement that addresses the above described challenges. In addition, it is desirable to provide a method for assembling an aircraft that addresses the above described challenges. Furthermore, other desirable features and characteristics will become apparent from the subsequent summary and detailed description and the appended claims, taken in conjunction with the accompanying drawings and the foregoing technical field and background.

BRIEF SUMMARY

An aircraft, a control surface arrangement, and a method of assembling an aircraft are disclosed herein.

In a first non-limiting embodiment, the aircraft includes, but is not limited to, an airframe. The aircraft further includes, but is not limited to, a control surface. The aircraft still further includes, but is not limited to, a rotary actuator that rotatably mounts the control surface to the airframe. The rotary actuator supports the control surface on the airframe. The rotary actuator is configured to rotate the control surface with respect to the airframe when the rotary actuator is actuated. The rotary actuator is still further configured to deliver torque to the control surface from a longitudinally intermediate portion of the rotary actuator.

In another non-limiting embodiment, the control surface arrangement includes, but is not limited to, a control surface. The control surface arrangement still further includes, but is not limited to, a rotary actuator that is coupled with the control surface and that is configured to rotatably mount the control surface to an airframe. The rotary actuator is configured to support the control surface on the airframe. The rotary actuator is further configured to rotate the control surface with respect to the airframe when the rotary actuator is actuated. The rotary actuator is still further configured to deliver torque to the control surface from a longitudinally intermediate portion of the rotary actuator.

In yet another non-limiting embodiment, the method of assembling an aircraft includes, but is not limited providing an airframe and a control surface. The method further includes, but is not limited to, positioning the control surface with respect to the airframe to form a plurality of coupling points. The method still further includes, but is not limited to, attaching the control surface to the airframe with a rotary actuator at at least one coupling point of the plurality of coupling points. The rotary actuator is configured to support the control surface on the airframe, to rotate the control surface with respect to the airframe when the rotary actuator is actuated, and to deliver torque to the control surface from a longitudinally intermediate portion of the rotary actuator.

BRIEF DESCRIPTION OF THE DRAWINGS

The present invention will hereinafter be described in conjunction with the following drawing figures, wherein like numerals denote like elements.

DETAILED DESCRIPTION

Figure 1:
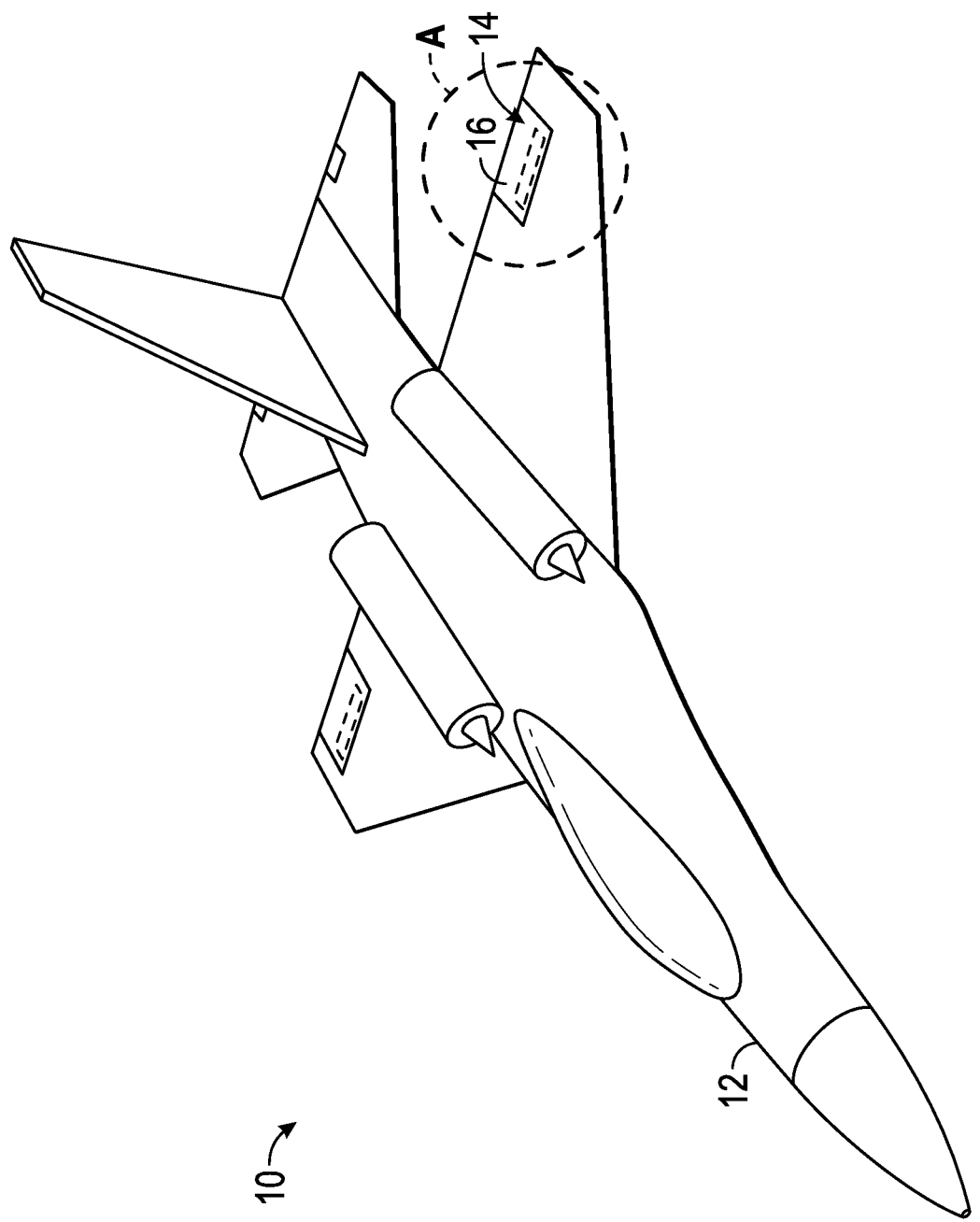
FIG. 1 is perspective view illustrating a non-limiting embodiment of an aircraft made in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

Various embodiments of an improved aircraft, an improved control surface arrangement, and an improved method of assembling an aircraft are disclosed herein. Embodiments of the aircraft, the control surface arrangement, and the method of assembling the aircraft each entail the use of a rotary actuator that serves as both hinge and actuator. Thus, rather than coupling the control surface to the airframe with a hinge and then employing a separate actuator to move the control surface to a desired position and to hold it there as is done in conventional control surface arrangements, embodiments of the present invention employ a rotary actuator to both couple the control surface to the airframe and also to move the control surface to a desired position. By using a rotary actuator in this manner, a single component can perform the functions previously performed by two separate components. This reduces the total part count included in the control surface arrangement and consequently reduces the weight, cost, and overall complexity of the control surface arrangement. As used herein, when reference is made to the control surface being coupled to an airframe or as being configured for coupling to an airframe, it should be understood that the control surface does not need to be coupled to a complete airframe, nor does it need to be configured for coupling to a complete airframe. Rather, it should be understood that the control surface may also be coupled to, or configured for coupling to, a portion or portions of an airframe. For example, and without limitation, a control surface that is coupled to, or that is configured for coupling to, a wing (whether or not the wing is attached to an airframe) would fall within the scope of the present disclosure. The same is true of a control surfaces that are coupled to, or that are configured for coupling to any other part of an aircraft, including, but not limited to, horizontal or vertical tails.

Embodiments of the rotary actuator that are compatible for use with the present disclosure are configured to deliver torque from an intermediate location along the longitudinal axis of the rotary actuator. In a non-limiting embodiment, the rotary actuator may comprise two concentric cylinders, one disposed within the other. The outer cylinder may include motors or may otherwise be configured to cause the inner cylinder to rotate. In an embodiment, the control surface may be coupled with the inner cylinder such that rotation of the inner cylinder will cause the control surface to move or pivot. This configuration is preferable to the use of a rotary actuator that delivers torque from its axial ends. A rotary actuator that delivers torque at its axial ends may give rise to a bending moment that may be transmitted to the control surface. This is undesirable and by employing a rotary actuator that delivers torque from a central region, the development of a bending moment can be avoided.

A greater understanding of the aircraft, the control surface arrangement, and the method for assembling an aircraft described above may be obtained through a review of the illustrations accompanying this application together with a review of the detailed description that follows.

FIG. 1 is a perspective view of a non-limiting embodiment of an aircraft 10 made in accordance with the teachings of the present disclosure. In the illustrated embodiment, aircraft 10 is depicted as a supersonic business jet. It should be understood that in other embodiments, aircraft 10 may comprise any type of aircraft without departing from the teachings of the present disclosure. Aircraft 10 includes an airframe 12 and a control surface arrangement 14. Control surface arrangement 14 includes a control surface 16 and a rotary actuator 18. In the illustrated embodiment, control surface 16 is depicted as an aileron. It should be understood that in other embodiments, control surface 16 may comprise any control surface that is suitable for use with airframe 12.

Figure 2:
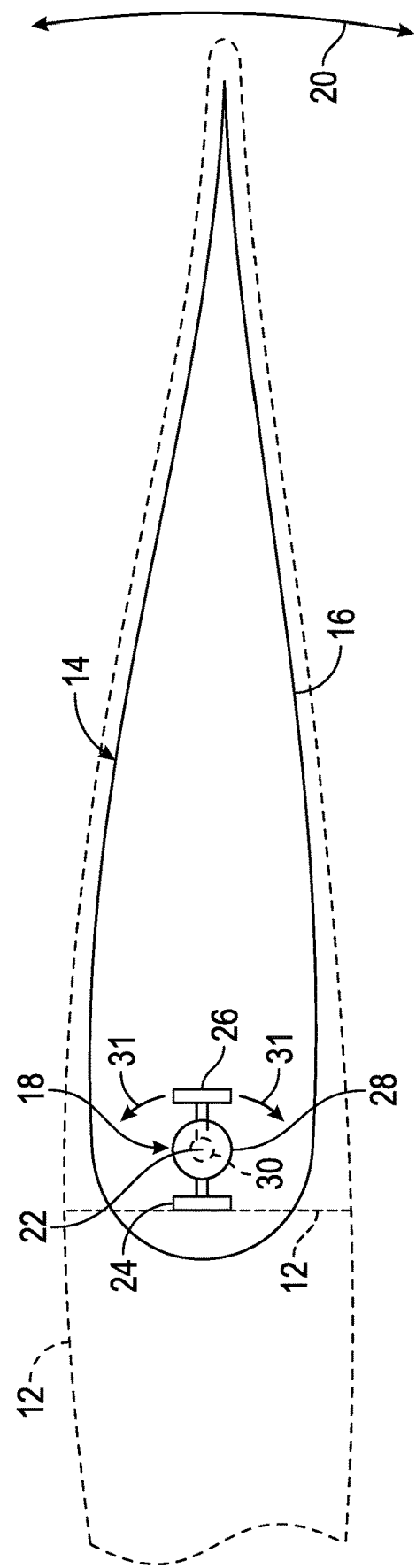
FIG. 2 is a schematic side view illustrating a non-limiting embodiment of a control surface arrangement suitable for use with the aircraft of FIG. 1.

FIG. 2 is a schematic side view illustrating a portion of airframe 12 (illustrated in phantom lines) and control surface arrangement 14 (illustrated in solid lines). In the illustrated embodiment, control surface 16 is configured to pivot in both an upward and a downward direction as indicated by arrow 20. In other embodiments, control surface 16 may be configured to move or pivot in a different manner without departing from the teachings of the present disclosure. In the illustrated embodiment, control surface 16 pivots about a center point 22 of rotary actuator 18 which is disposed along a longitudinal axis of rotary actuator 18.

Rotary actuator 18 includes a mounting bracket 24 and a mounting bracket 26. Mounting bracket 24 is attached to (and in some embodiments, may be integral with) an outer portion 28 of rotary actuator 18. A distal end of mounting bracket 24 is mounted to airframe 12. Mounting bracket 26 is attached to (and in some embodiments, may be integral with) an inner portion 30 of rotary actuator 18. A distal end of mounting bracket 26 is mounted to control surface 16. Inner portion 30 is configured to rotate with respect to outer portion 28. Rotary actuator 18 may include on or more motors (not shown) coupled with inner portion 30 that are configured to cause inner portion 30 to rotate with respect to outer portion 28 in the directions indicated by arrows 31. Because control surface 16 is coupled with inner portion 30 via mounting bracket 26, the rotation of inner portion 30 will cause corresponding rotation of control surface 16.

The use of rotary actuator 18 eliminates the need for an airframe mounted linear actuator and a control-surfacemounted bell crank arm, and thus presents are relatively more compact packaging arrangement. Additionally, because rotary actuator 18 has a relatively compact profile, control surface 16 and airframe 12 may each have correspondingly thin profiles which, in turn, facilitate flight at higher heights and faster speeds. Furthermore, the use of rotary actuator 18 not only imparts pivotal motion to control surface 16, but also supports control surface 16 on airframe 12, a function which was conventionally performed by a hinge. Therefore, the use of a rotary actuator such as rotary actuator 18 in a control surface arrangement such as control surface arrangement 14 will eliminate the need for some hinges, and in some embodiments, may eliminate the need for any hinges connecting the control surface to the airframe. This reduces the overall part count and simplifies the construction associated with control surface arrangement 14, to name just a few of the benefits associated with use of a rotary actuator such as rotary actuator 18 to couple control surface 16 to airframe 12.

Figure 3:
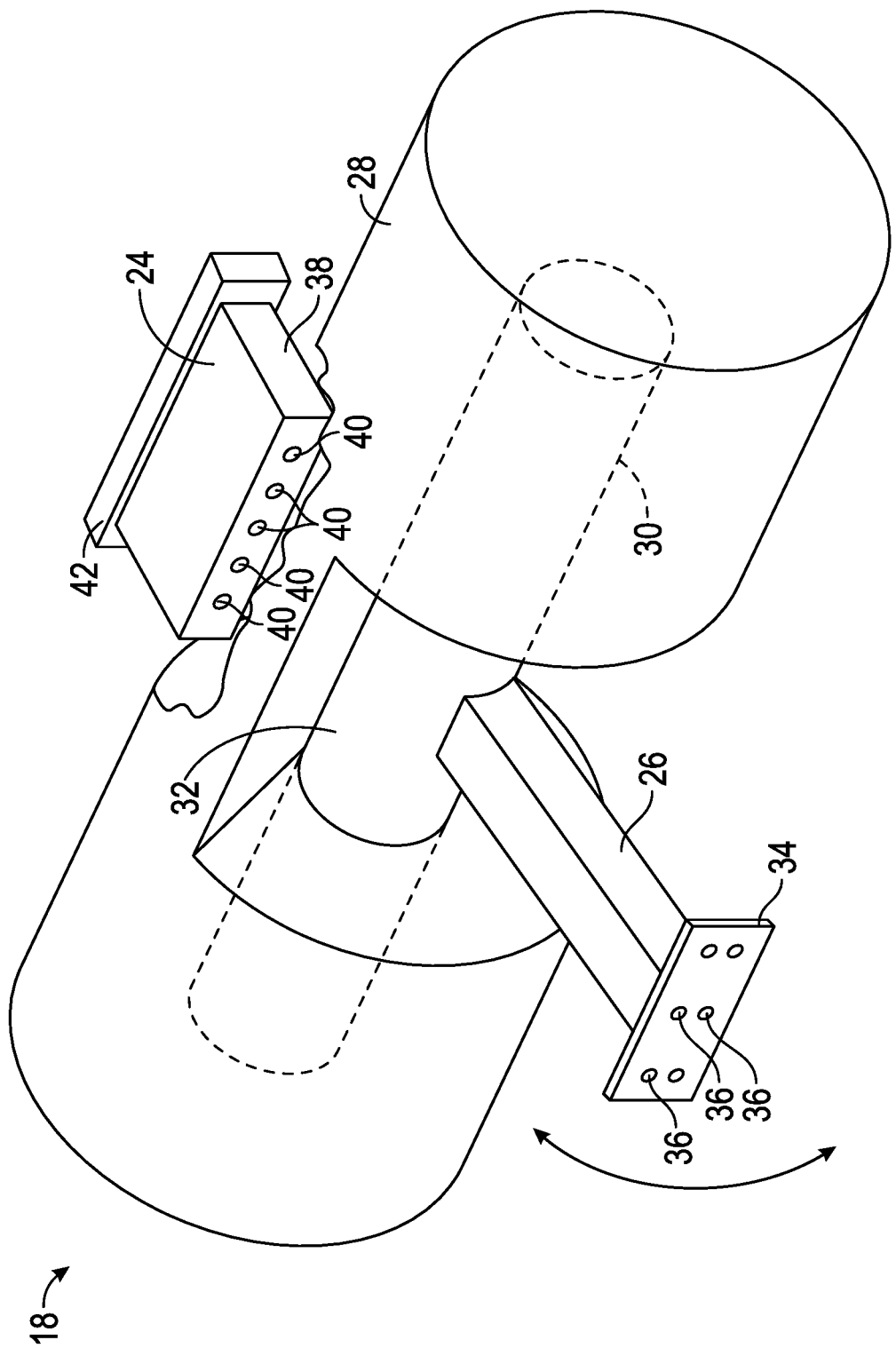
FIG. 3 is a fragmentary perspective view illustrating a non-limiting embodiment of a rotary actuator suitable for use with the control surface arrangement of FIG. 2.

FIG. 3 is a fragmentary, perspective view of rotary actuator 18. In the embodiment illustrated in FIG. 3, inner portion 30 and outer portion 28 have a cylinder within a cylinder configuration. In the illustrated embodiment, inner portion 30 extends longitudinally within outer portion 28 for a majority of the entire longitudinal length of outer portion 28. In other embodiments, inner portion 30 may extend longitudinally within outer portion 28 for any suitable length. Inner portion 30 is configured to rotate within outer portion 28 and outer portion 28 is configured to support inner portion 30 and to facilitate its rotational movement. Inner portion 30 and outer portion 28 may be comprised of any suitable material including, but not limited to, metals such as aviation grade aluminum stainless steel, titanium, magnesium. Non-metallic materials may also be employed and may include carbon fiber, reinforced plastic, or ceramic matrix composite.

With continuing reference to FIGS. 1-2, in the embodiment illustrated in FIG. 3, outer portion 28 has a carve out 32 that exposes inner portion 30. Mounting bracket 26 is attached to inner portion 30 and extends radially outwardly from inner portion 30 through carve out 32. Arranged in this manner, carve out 32 defines an arc through which mounting bracket 26 may pivot as inner portion 30 rotates. In other embodiments, outer portion 28 may comprise two separate and distinct components that cooperate to support inner portion 30 between them. In such an arrangement, mounting bracket 26 would be free to rotate for a full three hundred and sixty degrees.

In the illustrated embodiment, a distal end 34 of mounting bracket 26 is configured for engagement with control surface 16. As illustrated, distal end 34 includes a plurality of openings 36 that are configured to engage with fasteners extending from control surface 16. In other embodiments, distal end 34 may include protruding fasteners and a portion of control surface 16 may be configured to receive such protruding fasteners. In other embodiments, any other suitable arrangement for securing distal end 34 to control surface 16 may be employed without departing from the teachings of the present disclosure.

As illustrated in FIG. 3, mounting bracket 26 is attached to an approximate longitudinal center of inner portion 30 and, by extension, to an approximate longitudinal center of rotary actuator 18. As inner portion 30 rotates with respect to outer portion 28, mounting bracket 26 will impart a torque to control surface 16. Because this torque originates from an intermediate portion of rotary actuator 18 instead of being delivered from opposite longitudinal ends of the rotary actuator, a bending moment is avoided. Because rotary actuator 18 may be employed in arrangements having very thin control surfaces and having very thin airframe surfaces, avoiding such a bending moment provides control surface arrangement 14 with a considerable advantage.

With continuing reference to FIG. 3, a cut-away has been illustrated in outer portion 28 and a proximal end 38 of mounting bracket 24 is visible. A plurality of openings 40 are defined in proximal end 38 and are configured to receive fasteners (not shown) extending from outer portion 28. Engagement between openings 40 and the fasteners extending from outer portion 28 permit mounting bracket 24 to be mounted to outer portion 28. A distal end 42 of mounting bracket 24 also includes a plurality of openings (not shown) to permit engagement between mounting bracket 24 and an engagement feature of airframe 12.

Although the rotary actuator illustrated in FIG. 3 has been illustrated with a single carve out 32 and a single mounting bracket 24 and a single mounting bracket 26, it should be understood that in other embodiments, rotary actuator 18 may have other configurations. For example, in another embodiment, multiple mounting brackets 26 may be attached to inner portion 30. In another embodiment, multiple carve outs 32 may be defined in outer portion 28 to permit multiple mounting brackets 26 to be attached to inner portion 30. In other embodiments, multiple mounting brackets 24 may be attached to outer portion 28. In still other embodiments, combinations and permutations of the foregoing configurations may be employed.

Figure 4:
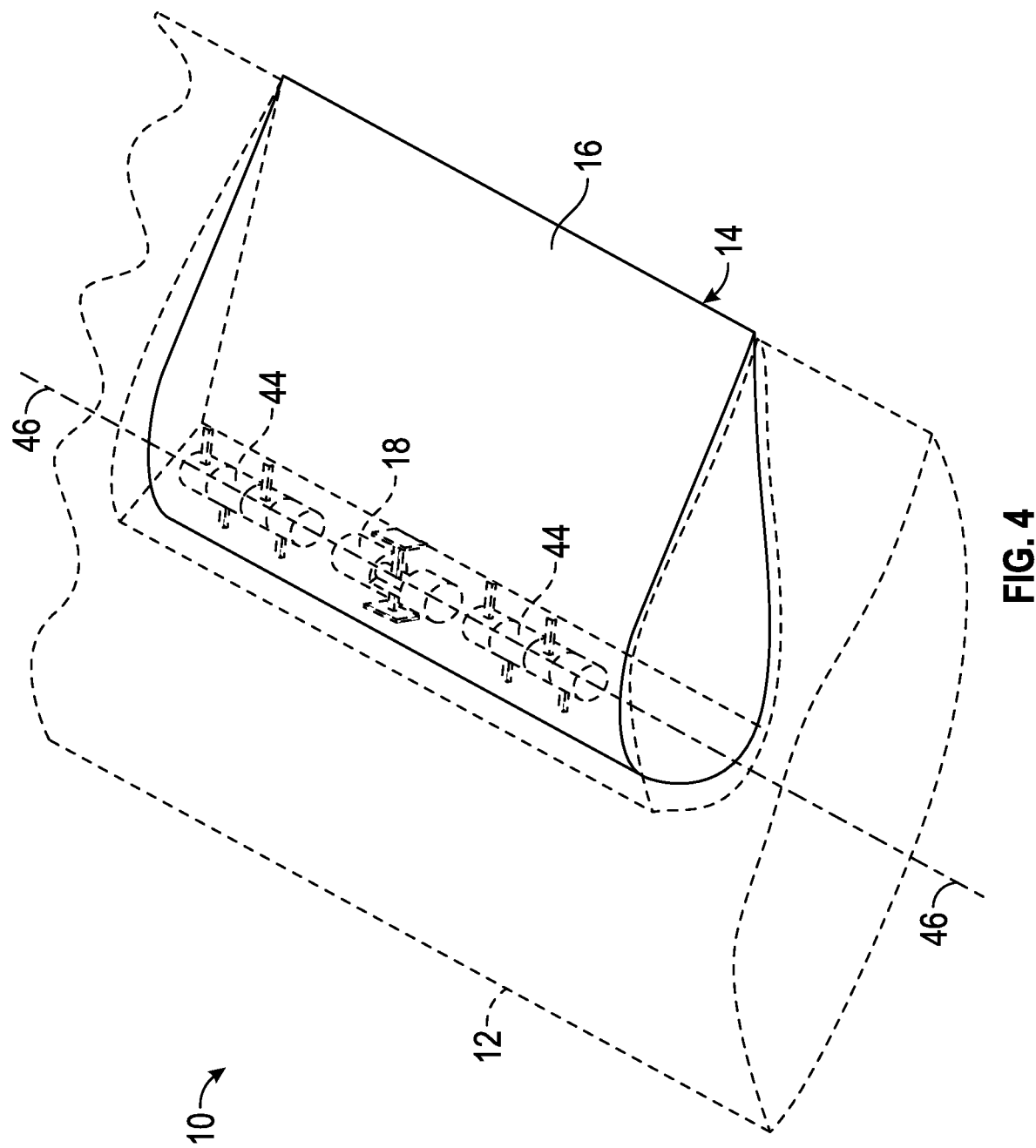
FIG. 4 is a perspective view illustrating a non-limiting embodiment of the control surface of FIG. 2.

FIG. 4 is a perspective view illustrating an expanded view of the portion of aircraft 10 circled identified by the reference letter A in FIG. 1. With continuing reference to FIGS. 1-3, FIG. 4 provides a perspective view of control surface arrangement 14 mounted to a portion of airframe 12. The embodiment of control surface arrangement 14 illustrated in FIG. 4 shows control surface 16 mounted to airframe 12 by a plurality of hinges 44 as well as by rotary actuator 18. As illustrated, rotary actuator 18 is axially aligned with hinges 44 along longitudinal axis 46. Arranged in this manner, rotary actuator 18 cooperates with hinges 44 to support control surface 16 on airframe 12. In addition, actuation of rotary actuator 18 will deliver a torque to control surface 16, causing it to pivot about longitudinal axis 46. In a conventional arrangement, one or more additional hinges would be employed in place of rotary actuator 18 and a linear actuator and bell crank arm would be needed in order to pivot control surface 16 about longitudinal axis 46. Use of rotary actuator 18 eliminates the need for these separate components.

FIG. 4 illustrates rotary actuator 18 positioned at an approximate longitudinal center of the axis along which control surface 16 and airframe 12 are coupled (the "coupling axis"). However, it should be understood that in other embodiments, rotary actuator 18 may be located at any desirable position along the coupling axis.

Figure 5:
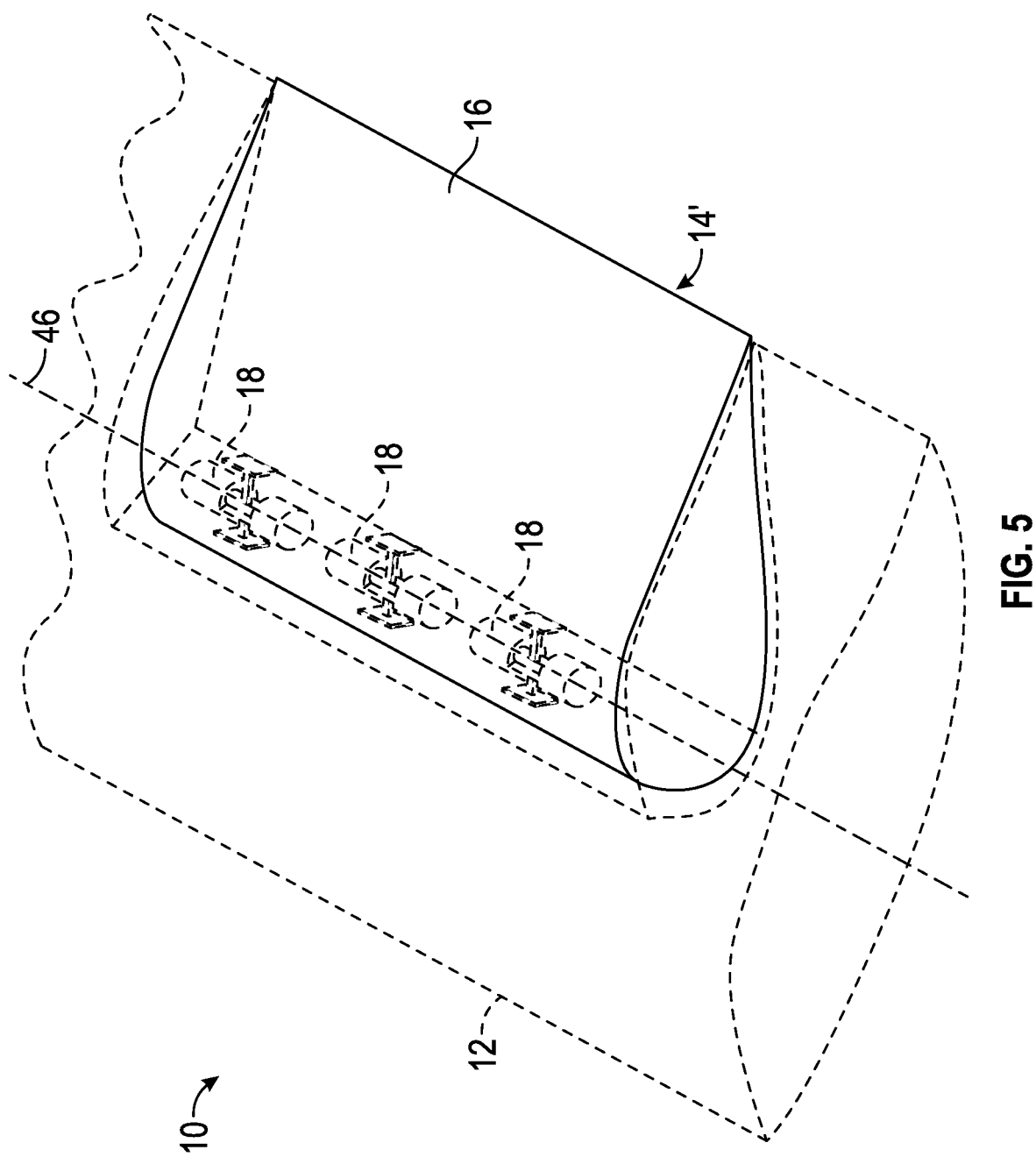
FIG. 5 is a perspective view illustrating another non-limiting embodiment of the control surface of FIG. 2.

FIG. 5 is a perspective view illustrating an expanded view of the portion of aircraft 10 identified by the reference letter A in FIG. 1. In the view presented in FIG. 5, however, aircraft 10 is equipped with control surface arrangement 14'. Control surface arrangement 14' completely eliminates the use of hinges 44 (see FIG. 4) and instead uses a plurality of rotary actuators 18 to support control surface 16 on airframe 12. Each rotary actuator 18 illustrated in FIG. 5 is axially aligned with each of the other rotary actuators 18 along longitudinal axis 46 to provide a single longitudinal axis about which control surface 16 may pivot.

Figure 6:
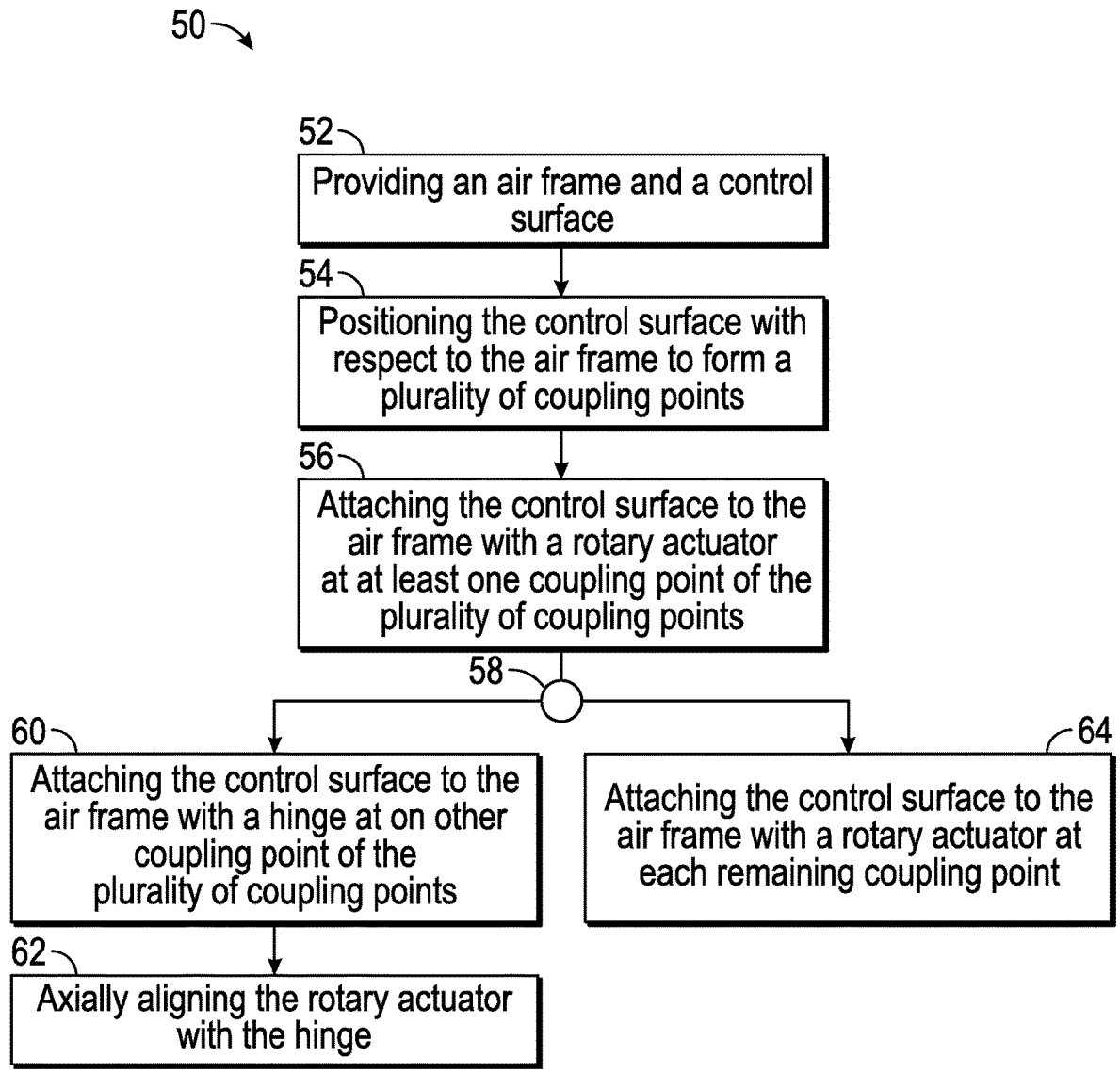
FIG. 6 is flow diagram illustrating a non-limiting embodiment of a method for assembling an aircraft in accordance with the teachings of the present disclosure.

FIG. 6 illustrates a non-limiting embodiment of a method 50 for assembling an aircraft.

At step 52, an airframe and a control surface are provided. In some embodiments, the airframe may have an adaptation or a plurality of adaptations that are configured to permit a coupling device, such as a hinge or a rotary actuator, to be affixed to it. Similarly, the control surface may also have an adaptation or a corresponding plurality of adaptations that permit the coupling device (hinge or rotary actuator) to be affixed to it.

At step 54, the airframe (or a portion thereof) and the control surface are positioned proximate one another to permit a coupling device to couple them together. The plurality of locations where the coupling device will engage the airframe and the control surface will be referred to herein as a plurality of coupling points. If the airframe and the control surface are each configured with adaptations to facilitate the coupling, the adaptations of the airframe are placed proximate corresponding adaptations of the control surface to form the plurality of coupling points.

At step 56, the control surface is joined to the airframe via a rotary actuator. The rotary actuator will join the control surface to the airframe at at least one of the coupling points.

At juncture 58, two alternate method paths are presented. If the control surface will be mounted to the airframe by the rotary actuator of step 56 and also by a plurality of hinges, then method 50 progresses to step 60.

At step 60, the control surface is further attached to the airframe by one or more hinges. The one or more hinges are positioned proximate a respective coupling point and then fixed to both the control surface and the airframe.

At step 62, the rotary actuator and the one or more hinges are axially aligned to form a longitudinal axis about which the control surface can move. In some embodiments, step 62 and step 60 may be carried out contemporaneously.

If the control surface will be mounted to the airframe exclusively by a plurality of rotary actuators, then method 50 progresses from juncture 58 to step 64.

At step 64, the control surface is attached to the airframe by a rotary actuator at each remaining coupling point. The rotary actuators may be axially aligned with one another to form a longitudinal axis about which the control surface may move.

Figure 7:
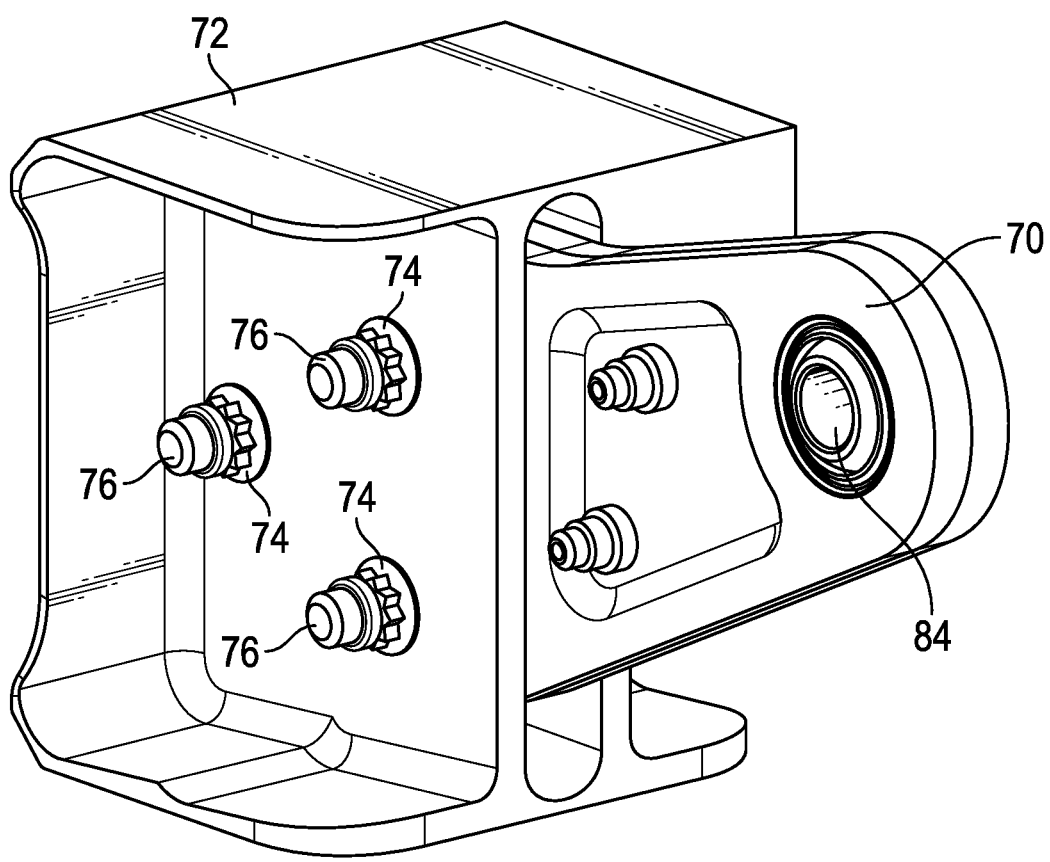
FIG. 7 is a perspective view illustrating an alternate embodiment of a mounting bracket and fitting that are compatible for use with the rotary actuator and control surface arrangement of FIGS. 2 and 3.
Figure 8:
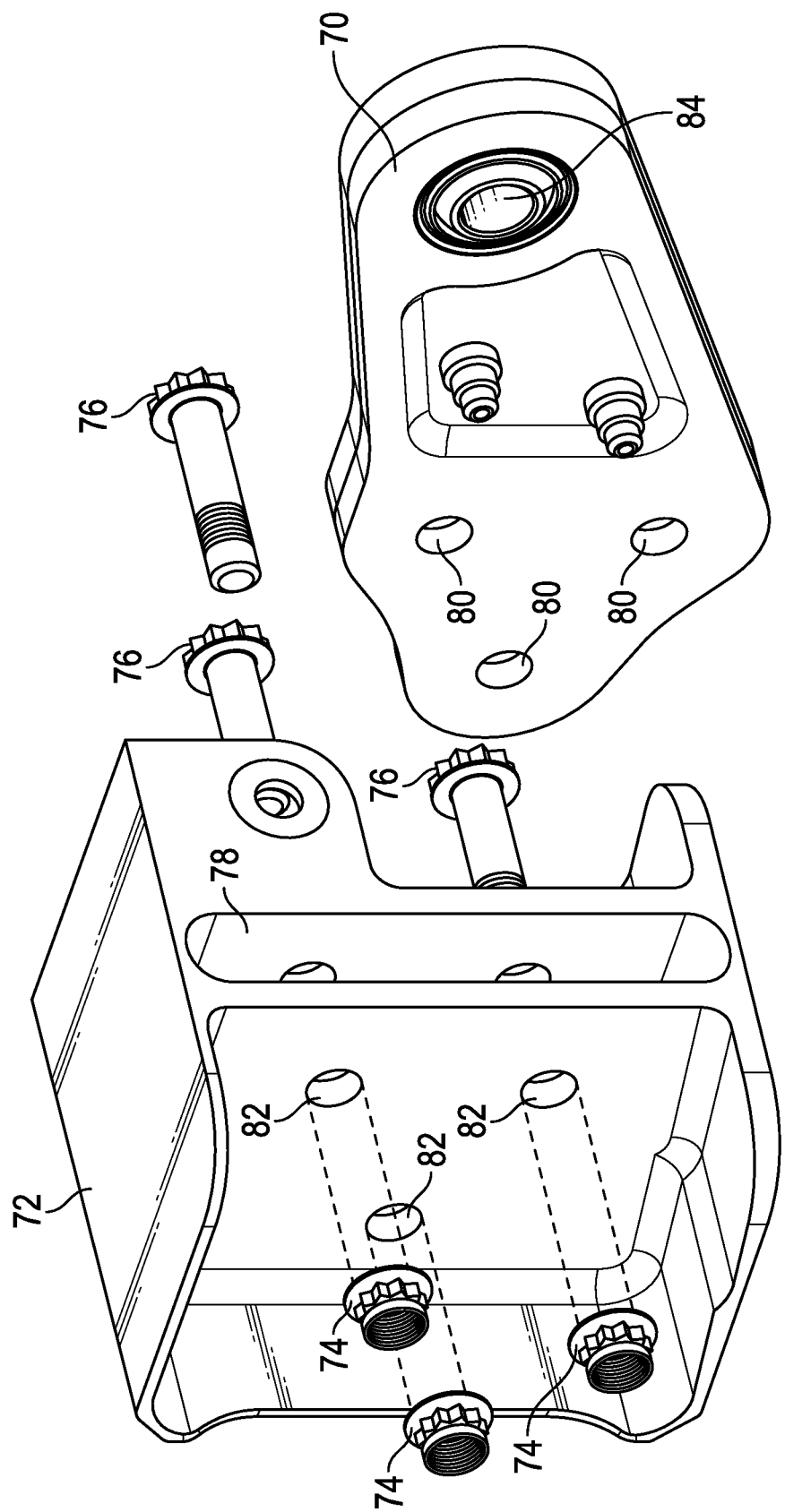
FIG. 8 is an exploded view illustrating the mounting bracket and the fitting of FIG. 7 separated from one another from the perspective of a first side.
Figure 9:
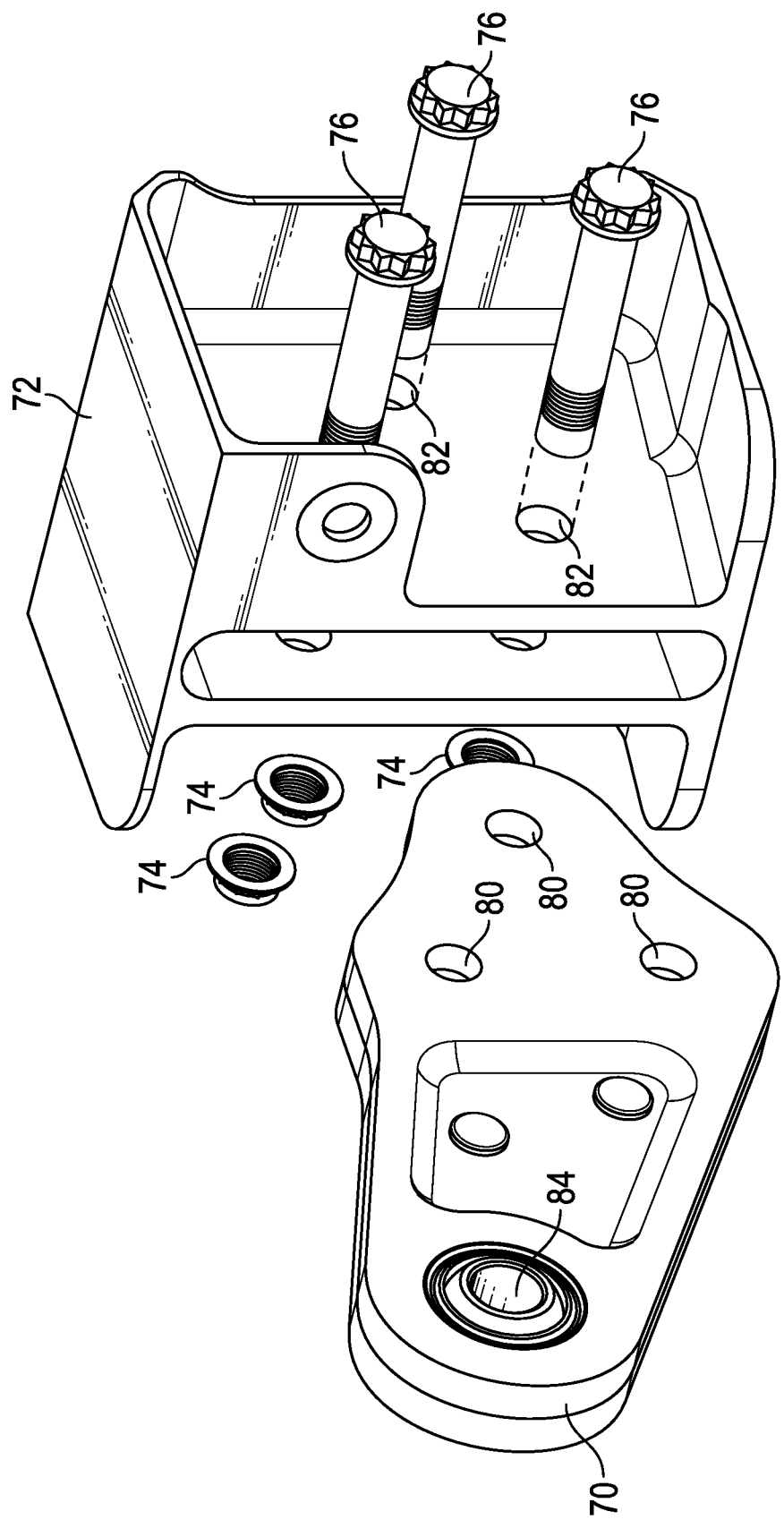
FIG. 9 is an exploded view illustrating the mounting bracket and the fitting of FIG. 7 separated from one another from the perspective of a second side.

With reference to FIGS. 7-9, an alternate embodiment of a mounting bracket 70 and a fitting 72 are illustrated. With continuing reference to FIGS. 1-5, mounting bracket 70 can be coupled to inner portion of rotary actuator 30 and fitting 72 can be coupled to airframe 12. Mounting bracket 70 includes an aperture 84 to facilitate coupling with inner portion of rotary actuator 30. Inner portion of rotary actuator may fit within aperture 84 and may be secured there via any suitable means. A second mounting bracket 70 and a second fitting 72 may be coupled to outer portion of rotary actuator 28 and control surface 16, respectively.

Mounting bracket 70 may be attached to fitting 72 via any suitable type of fastener. In the embodiment illustrated in FIG. 7, mounting bracket 70 is attached to fitting 72 via nuts 74 and bolts 76. In contrast to mounting brackets 24 and 26 of FIG. 3, which exert a tension force on the fasteners (not illustrated) that are used to mount the mounting brackets to airframe 12 and to control surface 16, mounting bracket 70 is attached to rotary actuator 18 and to fitting 72 in a manner that exerts a shearing force on bolts 76. In some applications, this may be a more desirable configuration.

FIGS. 8 and 9 illustrate, from opposite sides, mounting bracket 70 and fitting 72 while they are de-coupled from one another. Mounting bracket 70 has a generally planar configuration that enables it to fit within a slot 78 defined in fitting 72. In other embodiments, rather than having a tab and slot configuration, mounting bracket 70 and fitting 72 may have any suitable configuration that facilitates coupling to one another. A portion of mounting bracket 70 includes apertures 80 which align with apertures 82 of fitting 72. When apertures 80 are aligned with apertures 82, bolts 76 may pass through the aligned apertures and secure mounting bracket 70 and fitting 72 to one another.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An aircraft comprising:
   an airframe;
   a control surface; and
   a rotary actuator rotatably mounting the control surface to the airframe, the rotary actuator supporting the control surface on the airframe and configured to rotate the control surface with respect to the airframe when the rotary actuator is actuated, the rotary actuator further configured to deliver torque to the control surface from a longitudinally intermediate portion of the rotary actuator,
   wherein the rotary actuator includes a fixed portion that remains stationary with respect to the airframe when the rotary actuator is actuated, and further includes a rotating portion that is configured to rotate with respect to the airframe when the rotary actuator is actuated, and wherein rotation of the rotating portion causes the rotary actuator to deliver torque to the control surface, and
   wherein the rotating portion is disposed internally within the fixed portion and is arranged substantially concentric therewith.

2. The aircraft of claim 1, further comprising a hinge mounting the control surface to the airframe, the hinge cooperating with the rotary actuator to support the control surface on the airframe, wherein a first longitudinal axis of the rotary actuator and a second longitudinal axis of the hinge are axially aligned.

3. The aircraft of claim 1, wherein the rotary actuator has only a single connection point for delivering torque to the control surface.

4. The aircraft of claim 3, wherein the single connection point is disposed at an approximate longitudinal center of the rotary actuator.

5. The aircraft of claim 1, further comprising a plurality of the rotary actuators cooperating to rotatably mount the control surface to the airframe.

6. The aircraft of claim 5, wherein the control surface is rotatably mounted to the airframe in a manner that is free of hinges.

7. A control surface arrangement comprising:
   a control surface; and
   a rotary actuator coupled with the control surface and configured to rotatably mount the control surface to an airframe, the rotary actuator configured to support the control surface on the airframe, to rotate the control surface with respect to the airframe when the rotary actuator is actuated, and to deliver torque to the control surface from a intermediate portion of the rotary actuator,
  wherein the rotary actuator includes a fixed portion that remains stationary with respect to the airframe when the rotary actuator is actuated, and further includes a rotating portion that is configured to rotate with respect to the airframe when the rotary actuator is actuated, and wherein rotation of the rotating portion causes the rotary actuator to deliver torque to the control surface, and
  wherein the rotating portion is disposed internally within the fixed portion and is arranged substantially concentric therewith.

8. The control surface arrangement of claim 7, further comprising a hinge coupled with the control surface, the hinge configured to mount the control surface to the airframe and to cooperate with the rotary actuator to support the control surface on the airframe, wherein a first longitudinal axis of the rotary actuator and a second longitudinal axis of the hinge are axially aligned.

9. The control surface arrangement of claim 7, wherein the rotary actuator has only a single connection point for delivering torque to the control surface.

10. The control surface arrangement of claim 9, wherein the single connection point is disposed at an approximate longitudinal center of the rotary actuator.

11. The control surface arrangement of claim 7, further comprising a plurality of the rotary actuators coupled with the control surface and configured to cooperate to rotatably mount the control surface to the airframe.

12. The control surface arrangement of claim 11, wherein the control surface arrangement is configured to be mounted to the airframe in a manner that is free of hinges.

13. A method of assembling an aircraft, the method comprising the steps of:
  providing an airframe and a control surface;
  positioning the control surface with respect to the airframe to form a plurality of coupling points; and
  attaching the control surface to the airframe with a rotary actuator at at least one coupling point of the plurality of coupling points,
  wherein the rotary actuator is configured to support the control surface on the airframe, to rotate the control surface with respect to the airframe when the rotary actuator is actuated, and to deliver torque to the control surface from a longitudinally intermediate portion of the rotary actuator, and
  wherein the rotary actuator includes a fixed portion that remains stationary with respect to the airframe when the rotary actuator is actuated, and further includes a rotating portion that is configured to rotate with respect to the airframe when the rotary actuator is actuated, and wherein rotation of the rotating portion causes the rotary actuator to deliver torque to the control surface, and
  wherein the rotating portion is disposed internally within the fixed portion and is arranged substantially concentric therewith.

14. The method of claim 13, further comprising the step of attaching the control surface to the airframe with a hinge at another coupling point of the plurality of coupling points.

15. The method of claim 14, further comprising the step of axially aligning the rotary actuator with the hinge.

16. The method of claim 13, further comprising the step of attaching the control surface to the airframe with an additional rotary actuator at each remaining coupling point.

* * * * *